(12) United States Patent
Downer et al.

(10) Patent No.: US 6,910,108 B2
(45) Date of Patent: Jun. 21, 2005

(54) HARDWARE SUPPORT FOR PARTITIONING A MULTIPROCESSOR SYSTEM TO ALLOW DISTINCT OPERATING SYSTEMS

(75) Inventors: Wayne A. Downer, Portland, OR (US); Bruce M. Gilbert, Beaverton, OR (US); Thomas D. Lovett, Portland, OR (US)

(73) Assignee: International Business Machines Corporation, Armonk, NY (US)

( * ) Notice: Subject to any disclaimer, the term of this patent is extended or adjusted under 35 U.S.C. 154(b) by 453 days.

(21) Appl. No.: 10/045,923

(22) Filed: Jan. 9, 2002

(65) Prior Publication Data

US 2003/0131067 A1 Jul. 10, 2003

(51) Int. Cl.[7] ............................................... G06F 12/06
(52) U.S. Cl. ......................... 711/141; 711/173; 709/213
(58) Field of Search .................................. 711/141, 145, 711/173, 154, 201, 206, 214, 215; 709/201, 213; 707/8, 201

(56) References Cited

U.S. PATENT DOCUMENTS

| | | | |
|---|---|---|---|
| 3,641,505 A | | 2/1972 | Artz et al. |
| 5,887,138 A | | 3/1999 | Hagersten et al. |
| 5,893,144 A | | 4/1999 | Wood et al. |
| 5,905,998 A | | 5/1999 | Ebrahim et al. |
| 5,926,829 A | | 7/1999 | Hagersten et al. |
| 5,940,870 A | * | 8/1999 | Chi et al. .................... 711/206 |
| 6,035,378 A | | 3/2000 | James |
| 6,049,853 A | | 4/2000 | Kingsbury et al. |
| 6,075,938 A | | 6/2000 | Bugnion et al. |
| 6,088,769 A | * | 7/2000 | Luick et al. ................ 711/141 |
| 6,088,770 A | | 7/2000 | Tarui et al. |
| 6,167,490 A | * | 12/2000 | Levy et al. ................. 711/148 |
| 6,314,501 B1 | * | 11/2001 | Gulick et al. ............... 711/153 |
| 6,510,490 B2 | * | 1/2003 | Fuma et al. ................ 711/113 |
| 6,564,252 B1 | * | 5/2003 | Hickman et al. ........... 709/214 |

OTHER PUBLICATIONS

US 6,021,479, 2/2000, Stevens (withdrawn)
Koppe C. "Sleeping Threads: A Kernel Mechanism for Support of Efficient User Level Threads," Proceedings of Seventh IASTED–ISMM International Conference on Parallel and Distributed Computing and Systems, Washington, DC, Oct. 19–21, pp. 11–15.*
Anderson et al. A Case for Networks of Workstations: NOW.IEEE Micro, Feb. 1995. [Online] http://now.cs.berkeley.edu/Papers2/index.html, Feb. 1995.*

* cited by examiner

Primary Examiner—Pierre-Michel Bataille
(74) Attorney, Agent, or Firm—Law Offices of Michael Dryja; Abdy Raissinia

(57) ABSTRACT

A system and method of partitioning a multiprocessor or multinode computer system containing two or more partitions each of which contain at least three nodes or processors and a central hardware device communicating with a requestor node or processor, a target node or processor and at least one additional node or processor in the partition. The multiprocessor system architecture allows for partitioning resources to define separate subsystems capable of running different operating systems simultaneously. The method operates with the central device, a tag and address crossbar system, which transmits requests for data from the requestor node to the target node, but not to any of the additional nodes or processors which are not defined as part of a given partition. The method provides steps of assignment of definitions to physical ports with the central device corresponding with desired partitioning of resources within the system. Data processed within the system is assigned tags which themselves are related to the defined system resources allocated to one or more desired partitions within the system.

14 Claims, 11 Drawing Sheets

Port 0 Partition
Configuration Register — 89

| Bit | Field | Ref |
|---|---|---|
| 31 | Reserved | |
| 30 | | |
| 29 | | |
| 28 | | |
| 27 | | |
| 26 | | |
| 25 | | |
| 24 | | |
| 23 | | |
| 22 | | |
| 21 | | |
| 20 | | |
| 19 | | |
| 18 | | |
| 17 | | |
| 16 | | |
| 15 | | |
| 14 | | |
| 13 | | |
| 12 | | |
| 11 | | |
| 10 | | |
| 9 | | |
| 8 | P0Enable | 91 |
| 7 | | |
| 6 | P0PartWrProt | 77 |
| 5 | P0PortWrProt | 78 |
| 4 | P0Commit | 79 |
| 3 | P0LogID | 92 |
| 2 | | |
| 1 | P0ParNum | 93 |
| 0 | | |

FIG. 8

HARDWARE SUPPORT FOR PARTITIONING A MULTIPROCESSOR SYSTEM TO ALLOW DISTINCT OPERATING SYSTEMS

CROSS-REFERENCE TO RELATED APPLICATIONS

U.S. patent application Ser. No. 10/045,795 by T. B. Berg et al. entitled "Method And Apparatus For Increasing Requestor Throughput By Using Data Available Withholding" was filed on Jan. 9, 2002.

U.S. patent application Ser. No. 10/045,927 by T. B. Berg et al. entitled "Method And Apparatus For Using Global Snooping To Provide Cache Coherence To Distributed Computer Nodes In A Single Coherent System" was filed on Jan. 9, 2002.

U.S. patent application Ser. No. 10/045,821 by T. B. Berg et al. entitled "Multi-level Classification Method For Transaction Address Conflicts For Ensuring Efficient Ordering In A Two-level Snoopy Cache Architecture" was filed on Jan. 9, 2002.

U.S. patent application Ser. No. 10/045,564 by S. G. Lloyd et al. entitled "Transaction Redirection Mechanism For Handling Late Specification Changes And Design Errors" was filed on Jan. 9, 2002.

U.S. patent application Ser. No. 10/045,797 by T. B. Berg et al. entitled "Method And Apparatus For Multi-path Data Storage And Retrieval" was filed on Jan. 9, 2002.

U.S. patent application Ser. No. 10/045,925 by T. B. Berg et al. entitled "Distributed Allocation OF System Hardware Resources For Multiprocessor Systems" was filed on Jan. 9, 2002.

U.S. patent application Ser. No. 10/045,926 by W. A. Downer et al. entitled "Masterless Building Block Binding To Partitions" was filed on Jan. 9, 2002.

U.S. patent application Ser. No. 10/045,774 by W. A. Downer et al. entitled "Building Block Removal From Partitions" was filed on Jan. 9, 2002.

U.S. patent application Ser. No. 10/045,769 by W. A. Downer et al. entitled "Masterless Building Block Binding to Partitions Using Identifiers And Indicators" was filed on Jan. 9, 2002.

BACKGROUND OF THE INVENTION

1. Technical Field

The disclosure relates to hardware support for partitioning a system into multiple subsystems so each may provide a distinct operating system environment or partition within the system. The disclosure particularly relates to systems which utilize directly addressable memory subsystems both locally by a processor or group of processors (node) and remotely by the other nodes or processors in the same system.

2. Description of the Related Art

With the advent of multiprocessor computer systems which share memory across the system, many personal computers, work stations, and server computing machines using such multiple processor hardware architecture have become popular. Multiprocessor architecture has become an important feature because of the shared processing capabilities of coordinated multiprocessor systems which enhance performance by sharing memory across an entire system, all of which may be accessible by multiple groups of multi-processors (nodes) combined in a single system. Multiple processor computers can include large numbers of individual processors arranged in separate groups, each of which are associated with particular memory systems but all of which are coordinated with crossbar switch architecture systems allowing for data, data tagging and address control across the entire system. In the usual system architectural arrangement, processing boards, each of which has at least one processor and associated main memory, are connected by a high-speed crossbar switch communicating with each group of processors so as to maintain cache coherency among the various processors across the system.

Users of a multiprocessor system have varying needs for the level of computing power available from that system, or wish to run different operating systems simultaneously on the system. It is desirable to have the capability of dividing such a system running a single operating system instance into multiple subsystems which each provides its own distinct operating system environment. By partitioning a multiprocessor system in such a fashion, the system could be reconfigured on demand to adjust the allocation of system resources across the operating system partitions to provide the appropriate sizing of resources to each partition. Various patents issued relating to the field of the present invention teach multiple processor systems which have memory resource management techniques. The disclosures considered below illustrate the background art against which the advantages of the present invention will become apparent and be fully appreciated.

U.S. Pat. No. 5,905,998 issued to Ebrahim, et al., defines a system in which system memory and multiple processor units are each distinct rather than in a system where memory and processors are grouped together into nodes, each containing multiple processors and memory and where the mobile nodes exist in the operation of the system. This disclosure also requires the use and definition of master and duplicate cache tags. U.S. Pat. No. 5,905,998 does not teach a method of partitioning of a processor system.

U.S. Pat. No. 6,088,770 issued to Tarui, et al., describes a multiprocessor system that is partitioned into various nodes which may allow different operating systems to function similar to the present invention. This disclosure utilizes all the system memory shared as one, a distinct disadvantage. Further, U.S. Pat. No. 6,088,770 does not teach coherent sharing of memory between partitions.

U.S. Pat. No. 6,035,378 issued to James teaches memory page access monitoring logic that may provide information about memory access patterns, but does not teach the subject of partitioning memory systems.

U.S. Pat. No. 6,075,938 issued to Bugnion, et al., defines the use of layers of software that are inserted between the operating system and the application software such as to allow multiple operating systems to run concurrently on the system through the use of a virtual machine monitor.

U.S. Pat. No. 5,926,829 issued to Hagersten, et al., teaches a method for selecting between two different caching modes between NUMA and COMA systems. The overall architecture disclosed in U.S. Pat. No. 5,926,829 employs distributed memory directories and interfaces and does not to teach partitioning as presently disclosed.

U.S. Pat. No. 5,893,144 issued to Wood, et al., is almost identical to the disclosure and teachings set forth in Hagersten, et al. above.

U.S. Pat. No. 5,887,138 issued to Hagersten, et al., is similar to the '829 and '144 patent issued to Hagersten and Wood above.

U.S. Pat. No. 6,049,853 issued to Kingsbury, et al., defines a method in which portions of system memory used to store program code are copied into other locations in memory so that two users of the system may both have the code as local to increase system performance. This patent does not teach partitioning system resources.

U.S. Pat. No. 3,641,505 describes an older method of partitioning a system by using a less sophisticated method of providing large crossbar systems which interconnect processor modules of a particular type to other modules of types that require communication paths. Controls of the crossbar in this disclosure allows or disallows communications between them, thus effecting a crude partitioning method.

U.S. Pat. No. 6,021,479 issued to Stevens defines a memory management system which effects memory management Policies within the system. This disclosure provides for optimization of memory access latencies on a single system utilizing one operating system at a time.

SUMMARY OF THE INVENTION

A first aspect of the present invention is a multiprocessor computer system having at least two processing nodes, each node including at least one processor. Portions of a shared, distributed system memory are coupled to the processors. A communication pathway including a central hardware device connects a first requesting node which is requesting data, and a second target node which is the destination of the requested data. The central hardware device transmits requests from the said requesting node to the said target node but not to any other node. Preferably (but not necessarily), the nodes include local memory which is directly addressable both locally by the node associated with said memory and remotely by any other node. Also preferably, the central hardware device stores information for determining which nodes or processors are storing copies of one or more identified data elements in each said node's local memory.

Another aspect of the invention is a method for partitioning into two or more partitions the resources of a multiprocessor computer system comprising a plurality of processing nodes; a shared, distributed system memory; and a communication pathway connecting the processing nodes. Each one of the processing nodes includes at least one processor; and a portion of said shared system memory coupled to the processor and the communication pathway. The communication pathway includes communications ports each dedicated to communicating with one of the processing nodes. The method assigns a physical address to at least two of the ports and a logical address to each physical address, and stores the logical address in a memory. Each of the processing nodes is defined to correspond to no more than one partition, and data is routed within the system to correspond with the addresses of the resources defined as a partition.

It is the object of the present invention to provide a means of hardware support for partitioning a multi-node processor system by providing data registers enabled or disabled in accordance with definitions of which nodes are defined within a given partition. It is also the object of the present invention to provide a method of hardware support for partitioning a computer system utilizing multiple microprocessor groups or nodes, such that each partition may provide a distinct operating system environment while sharing the resources of other nodes in the entire system. It is further the object of the present invention to provide a method for coherent sharing of memory subsystems between nodes which are sharing a partition, where each partition has a portion of the total memory which is private to such partition and its range of addresses can be the same as another partitions similar memory addresses without allowing access between such separate memory systems. It is also an object of the present invention to provide a means to generate partition write protection register entries such as to enhance data overwrite protection by disabling the system's ability to write or accept data to or from a partition for which the data is not intended.

Other features and advantages of this invention will become apparent from the following detailed description of the presently preferred embodiment of the invention, taken in conjunction with the accompanying drawings.

BRIEF DESCRIPTION OF THE DRAWINGS

FIG. 8 is a diagram illustrating the contents of a partition configuration register for system port 0 used in accordance with the present invention.

DETAILED DESCRIPTION OF THE PREFERRED EMBODIMENT

Overview

Figure 1:
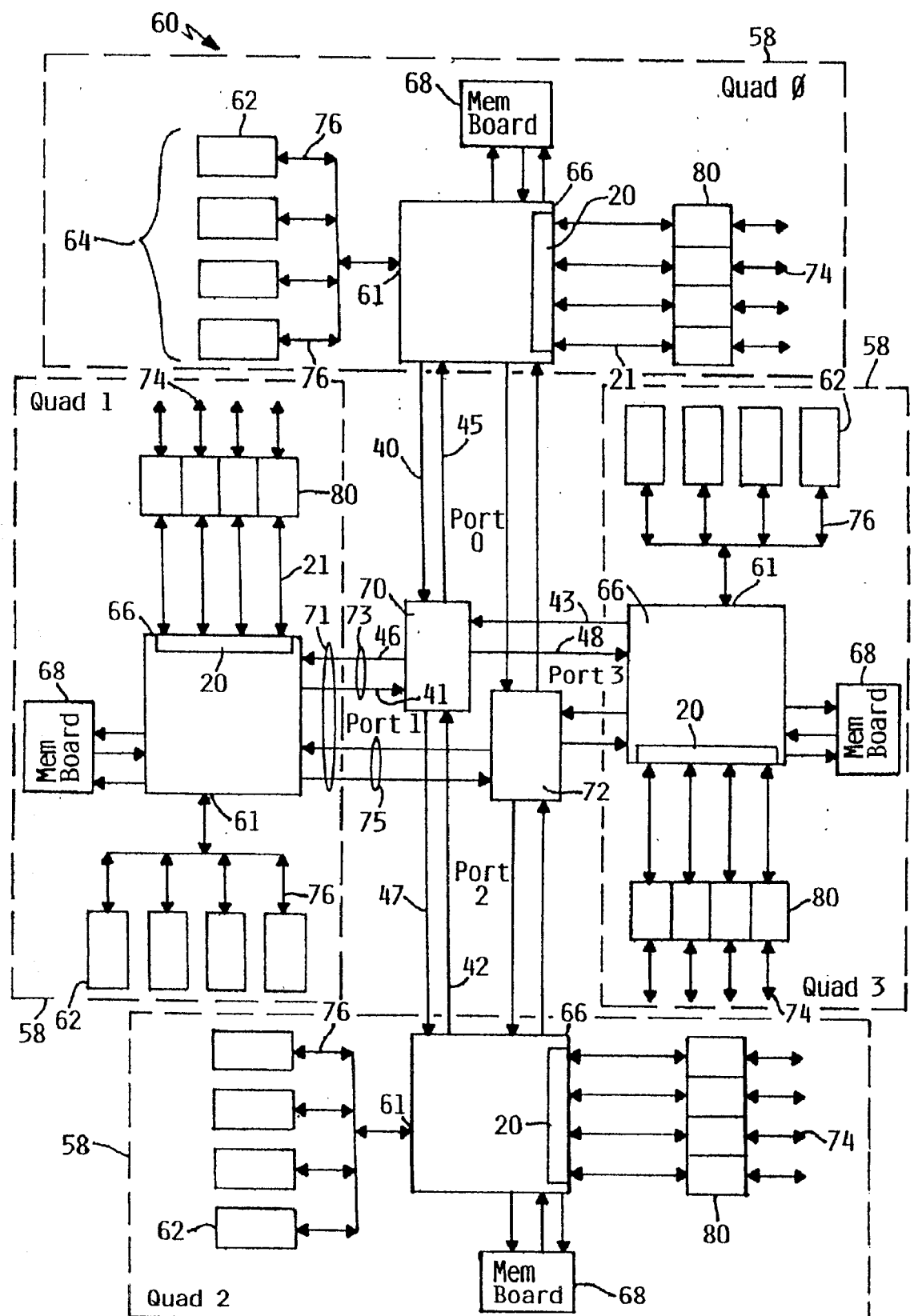
FIG. 1 is a block diagram of a typical multiprocessor system utilizing a data tag and address crossbar system in conjunction with a data crossbar system which the present invention may be employed to partition groups of processors to operate with independent operating systems.

The preferred embodiment of this invention reconfigures or adjusts the allocation of system resources across operating system partitions within the same computer system to provide the appropriate sizing of resources to each partition in a multiprocessor system containing multiple processors or multiple nodes. The preferred embodiment includes means to enforce and protect the isolation of each partition by creating write protection register entries.

Within a multiprocessor system, at certain points where data is requested by a component or subsystem within the system, the identities of the requesters of the data are compared to a list of partitioned identifiers and partitioned membership lists, where the membership or the identities of the requesters are stored, depending on the configuration of the partitions. Requests are processed only in the case where the requestor of data accesses resources which belong to a given defined partition to which the requestor is stored on a membership list. Requests for data are denied to resources which are not in the membership list of the partition to which the requester is a member. System resources in a multi-node system are allocated dynamically between the partitions created and provides the means for protecting or isolating the partitions for accessing resources which are not within their partition.

Partition configuration register means are used for each defined port providing for defined bit entries exclusively reserved for defining a given partition's enablement and a given partition's write protection as well as a port write protection. The preferred embodiment includes partition protection means comprised of register entries (bits) which enhance isolation of each partition by defining allowable access or writes from only those defined quads or nodes assigned to a given partition. A global configuration register means is used to configure system-wide parameters which include defined bit entries exclusively for use in defining write protection for each defined partition.

Effective isolation of defined partitions within a multi-node system is provided preventing the possibility of overwriting data generated from an operation in a different partition from overriding data in a given partition to which said data was not meant to be written. Apparatus in the tag and address crossbar system of the multiprocessor system disclosed includes a tag comparator module and a dispatch module each separately capable of comparing a given tag's partition vector or requesting port to the required partition vector of an intended output port to prevent output of the tag to a port not defined for the given partition. Entries in a system global configuration register as well as registers which store the partition configuration of the various nodes are also disclosed.

Technical Background

The preferred embodiment of this invention is applicable to multiprocessor computer systems which utilize multiple microprocessor groups or nodes, each of which is provided with its own input and output interfacing and memory systems, including memory control. Such multiprocessor systems typically partition physical memory associated with one local group of microprocessors into locally available memory and remote memory or remote cache for use by processors in other processor groups within a system. Multiple node microprocessor systems utilize tag and address crossbars as well as data crossbars to interconnect the various nodes or groups of microprocessors, thereby providing communications between such nodes.

In the preferred embodiment, a total of sixteen microprocessors are configured into four separate quads, each quad also being referred to as a node of the system. The nodes in the preferred embodiment are therefore a total of four, referred to in the disclosure as nodes 0, 1, 2 and 3. The method of the preferred embodiment defines two translations which are used to resolve the target physical node identification (ID) for a given request for data in relation to partitioned membership and logical node ID. The first translation defines all the physical nodes within a system that are members of a partition, which has a unique partition ID (PartID). The second translation steers requests from a given partition to the physical target node to which the requested address refers. In addition to the target physical node, the physical node IDs of other interested nodes may need to be calculated.

As used in the following description, ID refers to a value or number that identifies a system node or resource owned by or located within the same node. In the preferred embodiment, a node (or quad) includes four processors, associated memory and an input/output subsystem all interconnected through a system control agent, or controller all of which operate as a modular unit within the entire computer system. The memory control which interconnects the components within one group of processors, being one node, is interconnected to all the other node control agents through a tag and address crossbar system, as well as a data crossbar system.

A physical node ID is fixed based on the physical placement of the node in the interconnect crossbar systems, and every node has a unique physical node ID value that is consistent with its physical interconnection to the overall system. The physical node ID does not change if the node changes its partition ID or logical ID. In the invention, a partition ID is a virtual identifier that all physical nodes in a partition will share. Nodes with any other value for their partition ID are by definition not a member of the given partition. If any two physical nodes share the same partition ID, they are both members of the same partition within the system. A logical ID is the node offset for a given address relative to the partition where the address was requested The logical ID is unique to nodes within its own partition, but not necessarily unique relative to nodes in other partitions. In the implementation of the method disclosed herein, an address of a data request defines the logical ID of the node to which that address refers.

The memory control always issues requests using physical addresses relative to its partition. The physical address is itself relative to its partition number. Since more than one partition may be using the tag and address crossbar at a time, the partition number must be used to distinguish one partition's physical address from another's. Therefore, each tag and address crossbar physical port will have a two-bit partition number programmed to allow incoming requests to label themselves with their partition number. The said partition number is concatenated with address bits 36:35 (the logical node ID from the systems memory map) to form a lookup index that is used to look up the physical ID number that is used to identify the node where the address is defined as Home. The tag and address crossbar uses the physical node ID to route requests, replies, responses, and data associated with the request. The tag and address crossbar uses these physical IDs to identify source and target nodes (called snID and tnID) and to select tag quadrants for tag accesses.

Tag accesses must be aware of partitions when they look for matches, perform updates, and check for conflicts. The tag and address crossbar has a hardwired assignment of port numbers to physical pins on the typical application specific integrated circuit device (ASIC) (used as a memory control agent interconnecting the resources of one node to the tag and address crossbar), therefore port number and physical node ID are equal. Each port of the tag and address crossbar has two configuration variables: Assigned Partition and Logical Node ID. All ports in the same partition have the same value for Assigned Partition. Within a partition, the Memory control on a port is home to a portion of the memory space; the unique space assigned to that Memory control is programmed into the Logical Node ID. Finally, the Partition Vector is a four-bit vector that identifies all the quads present in the partition to which that port belongs. The Partition Vector is actually calculated from the first two configuration variables of the four ports. The example below in Table 1 shows that Partition 0 consists of port 2 only, and that Partition 1 consists of ports 1, 3, and 0 as logical nodes 0, 1, and 2. Therefore, port 1 is the logical node 0 in partition 1 (is home to the address range of 0 to 32 GByte), and port 3 is logical node 1 in partition 1 (is home to the address range 32–64 Gbyte).

TABLE 1

Example of Partition Vectors

| Port ID | Assigned Partition | Logical Node ID | Partition Vector | Comment |
|---|---|---|---|---|
| 0 | 0 1 | 1 0 | 1 0 1 1 | Partition 1, logical id 2, physical id 0 |
| 1 | 0 1 | 0 0 | 1 0 1 1 | Partition 1, logical id 0, physical id 1 |
| 2 | 0 0 | 0 0 | 0 1 0 0 | Partition 0, logical id 0, physical id 2 |
| 3 | 0 1 | 0 1 | 1 0 1 1 | Partition 1, logical id 1, physical id 3 |

The tag and address crossbar will not propagate requests to ports that are not included in the Partition Vector of the port where the request was made. It may propagate requests and make replies to any or all of the ports that are included in the Partition Vector, as circumstances require. In the above example, a request from port 1 can be propagated to ports 0 and 3 because they are in port 1's Assigned Partition. The request cannot be propagated to port 2, nor can the tag for port 2's Remote Cache be modified in any way due to port 1's request.

Technical Details

The preferred embodiment relates specifically to a system and a method for use in a multiple processor system which utilizes a tag and address crossbar system in combination with a data crossbar system, together with associated memory and control means comprising a data processing system. The disclosed embodiment is a means and a method which allows partitioning of the entire system such that distinct operating systems may run simultaneously across the system. The method and means demonstrated below permits a system using multiple processors with a processor group interface control system, and an address tag and crossbar system, to partition one or more processor groups into partitions by dividing resources such as system memory across the entire system but function independently for purposes of running separate operating system software on each separately partitioned group of one or more processors. System memory is divided among partitions but shared by the partition to which it is allocated.

FIG. 1 presents an example of a multiprocessor system according to the preferred embodiment, showing a multiprocessor system which utilizes four separate central control systems (control agents) 66, each of which provides input/output interfacing and memory control for an array 64 of four Intel brand Itanium class microprocessors 62 per control agent 66. In many applications, control agent 66 is an application specific integrated circuit (ASIC) which is developed for a particular system application to provide the interfacing for each microprocessor bus 76, each memory 68 associated with a given control agent 66, PCI interface bus 21, and PCI input/output interface 80, along with the associated PCI bus 74 which connects to various PCI devices. Bus 76 for each microprocessor is connected to control agent 66 through bus 61. Each PCI interface bus 21 is connected to each control agent 66 through PCI interface block bus 20.

FIG. 1 also illustrates the port connection between each tag and address crossbar 70 as well as data crossbar 72. As can be appreciated from the block diagram shown in FIG. 1, crossbar 70 and crossbar 72 allow communication between each control agent 66, such that addressing information and memory line and write information can be communicated across the entire multiprocessor system 60. Such memory addressing system is necessary to communicate data locations across the system and facilitate update of control agent 66 cache information regarding data validity and required data location.

A single quad processor group 58, also referred to as a quad 58, is comprised of microprocessors 62, memory 68, and control agent 66. In multiprocessor systems to which the present invention relates, quad memory 68 is usually Random Access Memory (RAM) available to the local control agent 66 as local or home memory. A particular memory 68 is attached to a particular controller agent 66 in the entire system 60, but is considered remote memory when accessed by another quadrant or control agent 66 not directly connected to a particular memory 68 associated with a particular control agent 66. A microprocessor 62 existing in any one quad processor group 58 may access memory 68 on any other quad processor group 58. NUMA (Non-Uniform Memory Access) systems typically partition memory 68 into local memory and remote memory for access by other quads.

Figure 2:
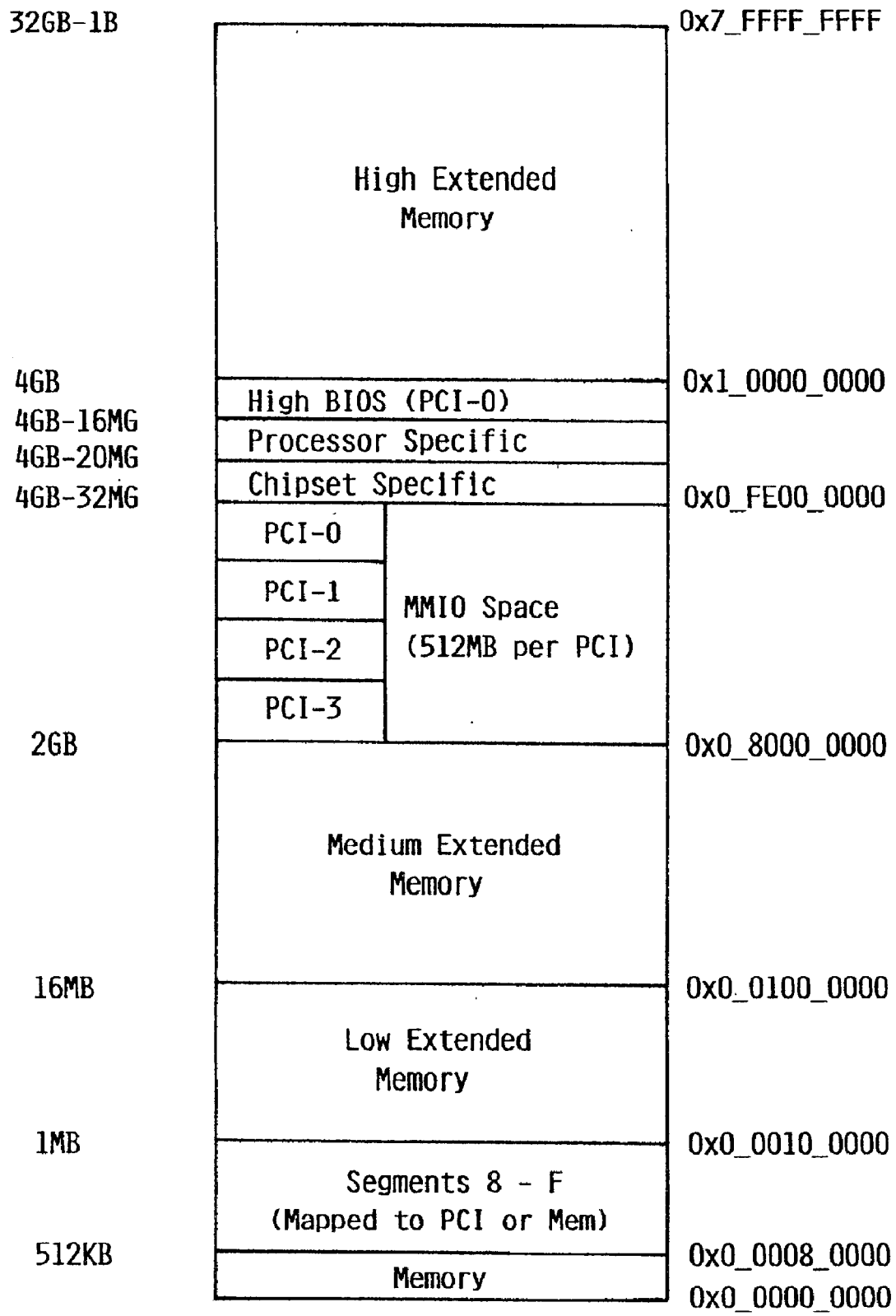
FIG. 2 is a diagram presenting an overview of the memory address map for the first processor group or quad in a given partition created by the invention.

In a typical multiprocessor system using distributed memory as shown in FIG. 1, the data tag and address crossbar 70 allows partitioning a total of sixteen individual processors 62 shown in groups of four, into between one and four separate partitions. In describing the invention, reference will be made to a quad, also illustrated in the system diagram of FIG. 1. A quad, also a node in the present invention, operates as a separate node, each quad or node being interconnected to the rest of the system through ports that are associated with each quad. The memory map of a single quad of a multiprocessor system which uses the partitioning method is shown in FIG. 2. Each of the four quads 58 has one 32 GByte memory space allocated to it, of which 2 GByte is memory-mapped input/output (MMIO), CSRs (control and status data registers), and other non-memory addresses. Each quad 58 is hardwired to a port of crossbar 70. Each quad 58 is configured with a partition ID and a logical ID. The partition ID (0, 1, 2, or 3) designates the quad's membership in an operating system and shared memory space. The logical ID (0, 1, 2, or 3) designates the quad's placement in the memory space of its partition. The logical ID specifies the physical address range that quad 58 treats as its local memory within that partition, i.e., the memory stored in its own memory 68. When a processor 62 requests an address that has the same logical region as its quad's logical ID, then the address is local to the processor or "home", otherwise it is "remote" to that processor.

The memory map of all quads in a partition is orthogonal to all addresses in another partition. System 60 can therefore be configured in any possible arrangement of partitions provided that each partition has a unique partition ID and each quad 58 has a unique logical ID within that partition. It should be appreciated that quad 58 is the smallest configurable unit in terms of partitioning a system using the method of the invention, as individual processors, 10 (input/output) devices, or portions of memory 68 in quad 58 cannot be configured to different partitions. Each quad is allocated a 128 MByte Remote Cache memory, which resides in the main memory 68 of each quad 58. Crossbar 70 maintains tags for each quad's Remote Cache.

As a system is configured with virtually identical processor groups (nodes) or quads 58, the entire system may be partitioned as a single system or up to four separate partitioned systems using the method disclosed. In the preferred embodiment, the maximum total number of quads 58 is four, as configured in FIG. 1. Every port of data tag and address crossbar 70 is assigned to one of four control agents 66 by virtue of its physical connection between agent 66 and crossbar 70. Interconnections between tag and address crossbar 70 and data crossbar 72 to each of control agents 66 are accomplished through bus 71. Shown in FIG. 1 as a connection from tag and address crossbar 70 and data crossbar 72 to the control agent 66 in quad one, the bus is also referred to as a port. Though shown only at quad one, the configuration of bus 71 is duplicated for each quads 58 as can be appreciated by the connections for ports 0, 1, 2 and 3 shown in FIG. 1. Bus 73 is the portion of bus 71 that connects control agent 66 to tag and address crossbar 70. Bus 75 is the portion of bus 71 which connects the data crossbar 72 to each control agent 66. Each of the quads of the system demonstrated in FIG. 1, communicate to the remaining portions of the system through tag and address crossbar 70 as well as data crossbar 72 through channels defined as ports. Ports 0, 1, 2 and 3 are all shown on FIG. 1 interconnecting the crossbar systems with the quadrant or node control agent 66 through input and output portions of each port, interconnecting each crossbar to each given quad. All of the processor groups or quads 58 in FIG. 1 are connected in a similar fashion, as can be appreciated from the figure, utilizing interconnect bus 71 as shown in port 1 of FIG. 1. The crossbar systems, including the ports interconnecting the crossbars with each of the quads 58 are essentially a communication pathway connecting the processing nodes so that they may all share access to data stored throughout the system.

Figure 5A:
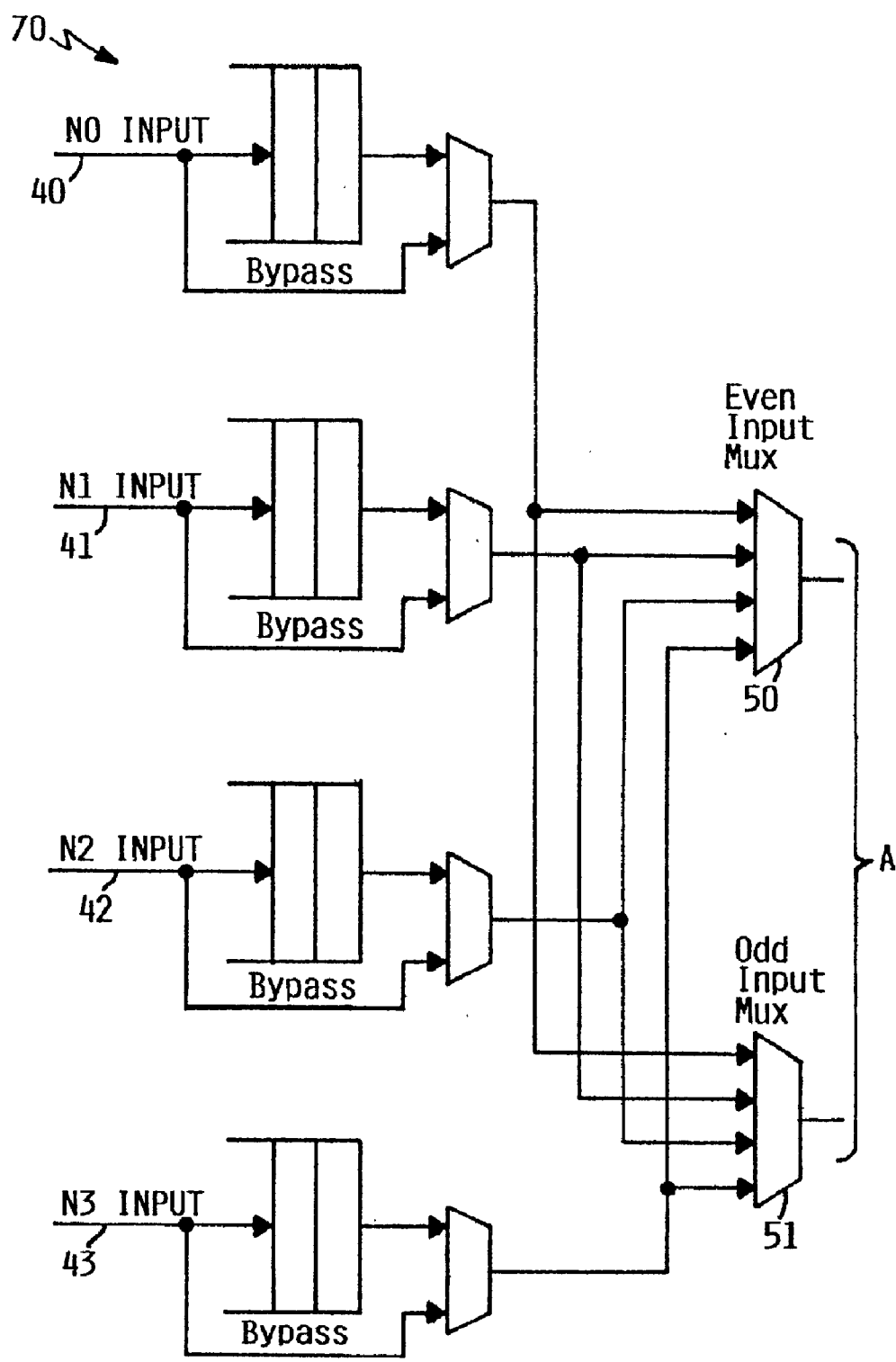
FIG. 5 is a block diagram of the tag and address crossbar system connecting each quadrant or node in a multiprocessor system in which the invention is used.
Figure 5B:
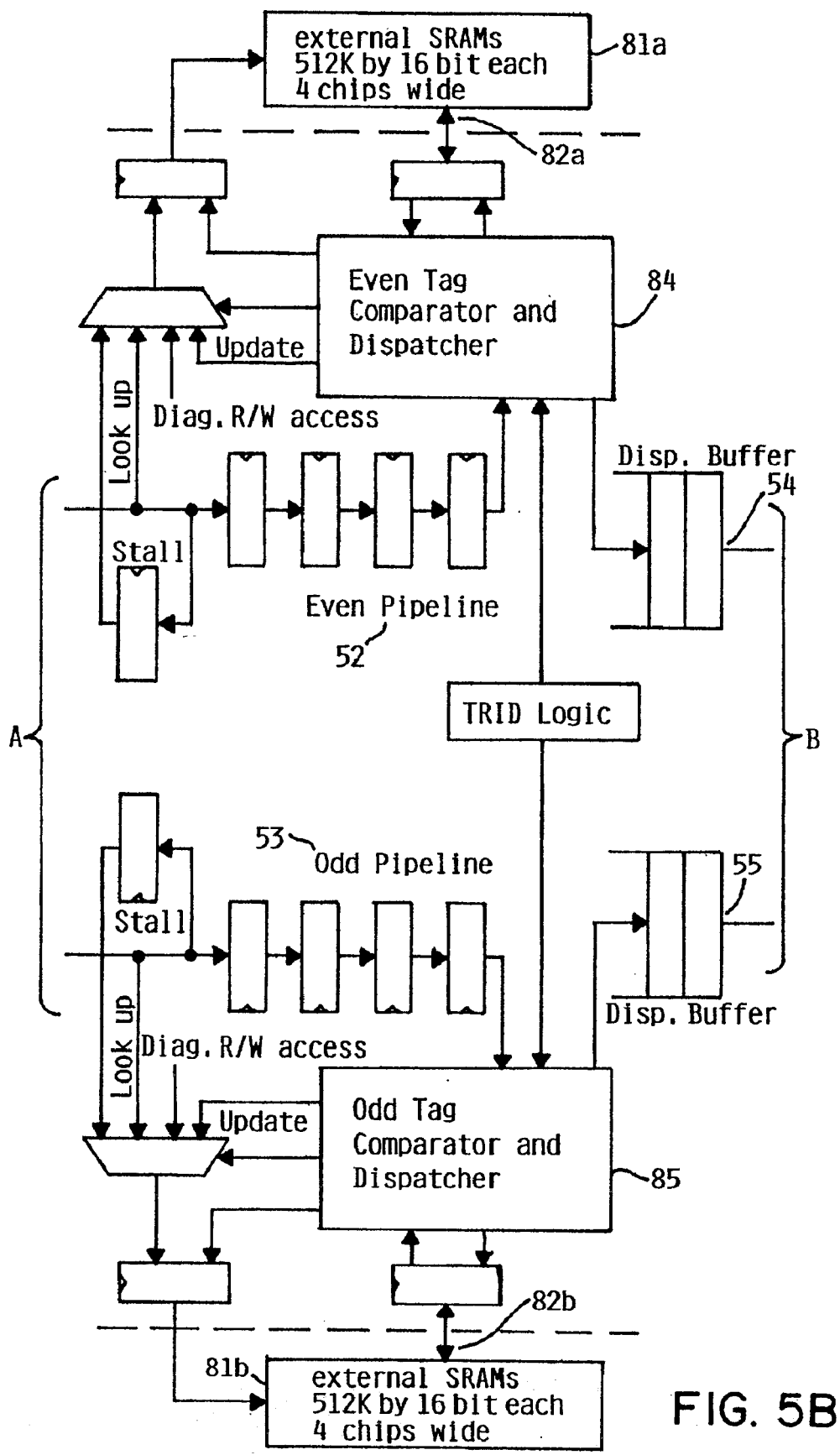
Figure 5C:
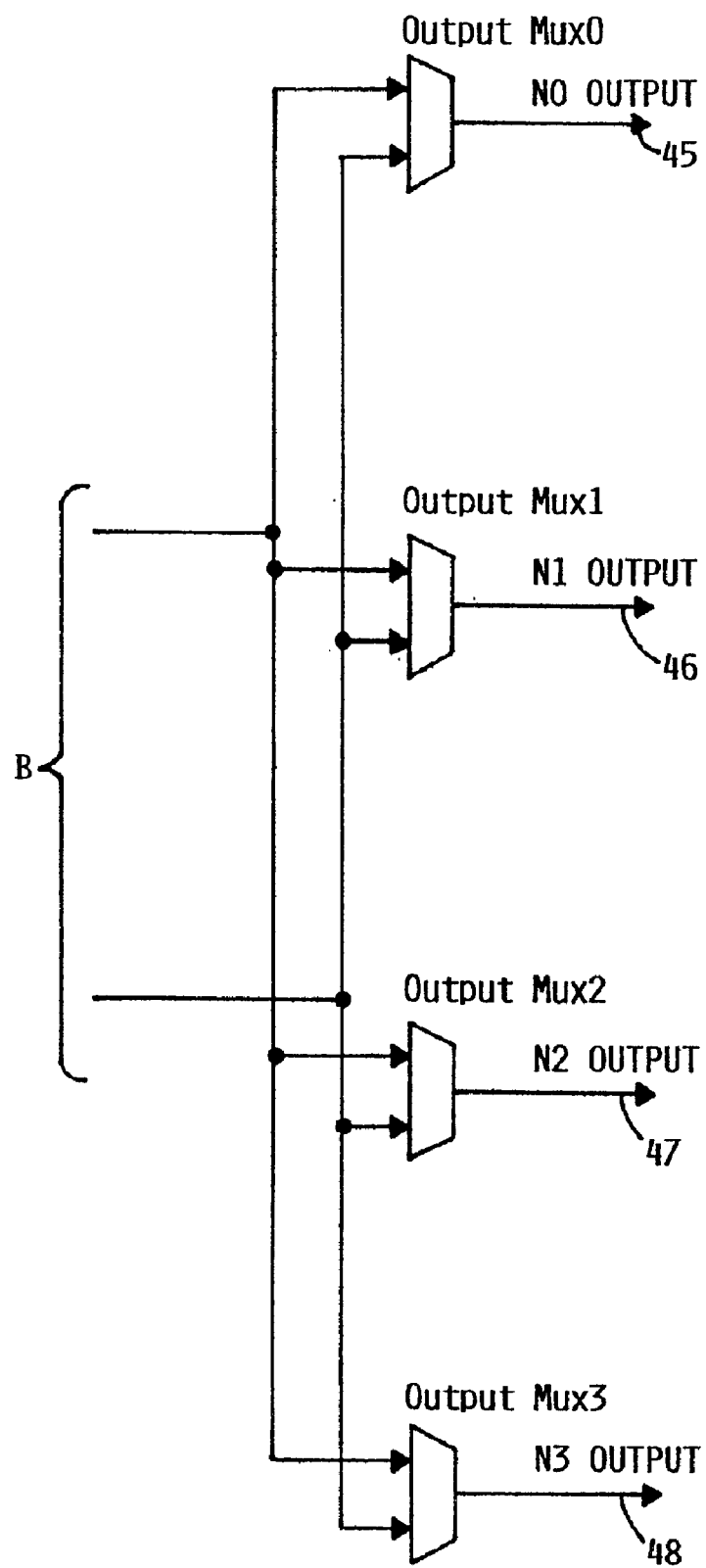

FIG. 5 illustrates internal logic of tag and address crossbar 70 shown in FIG. 1. Input 40 for port 0, input 41 for port 1, input 42 for port 2, and input 43 for port 4 illustrate part of the communications pathway connections each control agent 66 in each quad or node into tag and address crossbar 70. Likewise, FIG. 5 illustrates port 0 output 45, port 1 output 46, port 2 output 47 and port 3 output 48, each said output also illustrated on the entire system block diagram shown in FIG. 1. Tag look-up registers which function with tag and address crossbar 70 are shown at 81a and 81b. Registers 81a and 81b are identical except that they are associated with an even pipeline and odd pipeline for tag processing as illustrated in FIG. 5. The dual pipeline design is provided to reduce latency in the system by assigning processing to even numbered tags to the even pipeline and odd numbered tags to the odd pipeline so that simultaneous processing may occur.

Continuing with FIG. 5, input 40, 41, 42 and 43 are each introduced through a buffer, are operatively connected to even input multiplexor 50, and odd input multiplexor 51, the appropriate multiplexor (mux) being selected in accordance with the even or odd relationship with the input tag. Each multiplexor 50 and 51 serves to serialize the flow of tags from the four inputs. The outputs of muliplexor 50 and 51 are sent to another multiplexor to be sent ultimately to tag look-up registers 81a and 81b. Even pipeline logic 52 and odd pipeline logic 53 evaluates the tags being presented and the request type to generate an output response and requests for ports that are connected to a defined quad within its partition. The resulting output entries are buffered in the dispatch buffer 54 and 55, each of which is a first in, first out (FIFO) type buffer. Dispatch buffers 54 and 55 decouples timing variances between the tag logic shown and the output selection logic. Entries are stored in dispatch buffers 54 and 55 in first in, first out order until they can sent to the destination ports, being output 45, 46, 47 or 48, representing one output to each port or quad.

Figure 6:
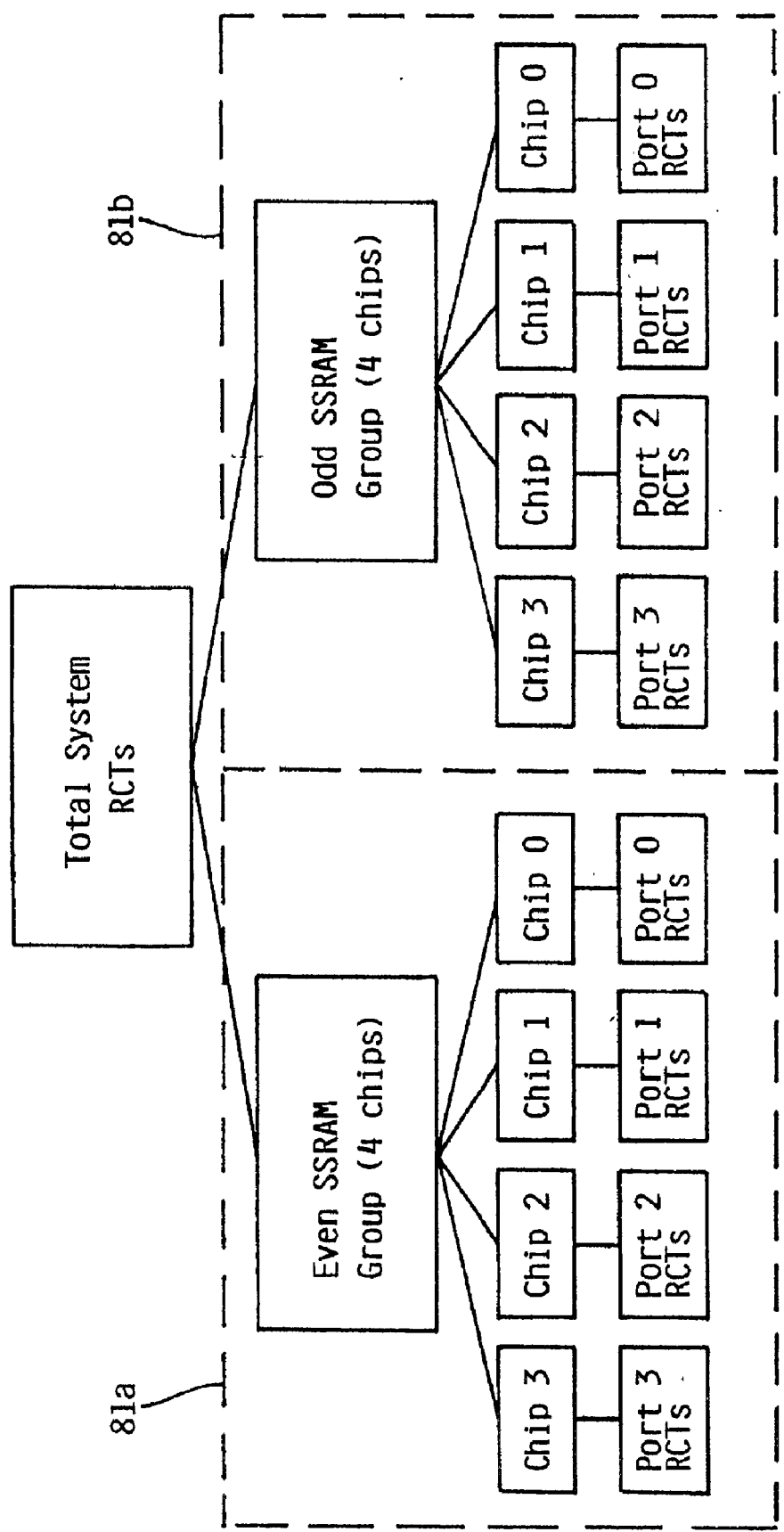
FIG. 6 is a block diagram of the mapping of the remote cache tags.

Tag look-up register 81a and 81b, identical in configuration, are made up of four SRAMS chips, each being 512 kbits by 16 bits in size. Tag look-up register 81a is connected through line 82a to even tag comparator and dispatcher 84. Though shown as one connection in FIG. 5, connection 82a is actually four paths, each corresponding to inputs 0, 1, 2 and 3 each port as described. Register 81b, connected to the odd tag comparator and dispatcher 85 through connection 82b is essentially identical in function. Path 82b is likewise comprised of four paths, each corresponding to a port. Tag look-up registers 81a and 81b is comprised of external memory chips which interfaces with crossbar 70, and are used to store the tag and state information for all of the remote cache tags in the entire system. Such information is not directly accessable by memory control agent 66, so all cacheable transactions generated in control agent 66 must access crossbar 70 to access or "snoop" crossbar 70's remote cache tags (RCTs). The physical configuration of register 81a and 81b is illustrated in the block diagram shown in FIG. 6. As shown in FIG. 6, register 81a and 81b is implemented with syncronous static random access memory chips (SSRAM) which operate at the internal clock frequency of crossbar 70, being 133 MHz in the present invention. As can be seen also in FIG. 6, there are two groups of external SSRAMs, the groups being divided to odd and even pipelines as shown on FIG. 5. Each group of RCTs is split into four separate chips, with each separate chip representing a physical port of crossbar 70. As there are a total of four ports in the preferred embodiment as shown in the system diagram of FIG. 1, it can be appreciated that each port corresponds to a potential logical quad in the present invention, as earlier described. Therefore, each port of the RCT interface represents the RCTs for a physical quad's remote cache.

One means of partition data overwrite protection is handled by tag comparator and dispatcher 84 and 85 in FIG. 5. Transactions being tracked by tag look-up register 81a and 81b can never be output to path 82a or 82b if such transactions are not defined to be in the partition to which such output would be writing. For example, in the four node system illustrated in FIG. 1, if two partitions were defined, it can be seen that input 40 and 41 may belong to one partition while 42 and 43 are defined in a second partition. Tags being input into 40 and 41, through use of the present invention, are processed and eventually compared to determine whether they may be outputted from register 81a and 81b through connection 82a and 82b. In a two-partition system, the invention prevents possible outputting through those connections between registers 81a and b and comparators 84 and 85 on lines which would be defined strictly for input 42 and 43. Thus a level of protection for existing partitions is presented. Tag look-up register 81a and 81b keeps track, on a global basis, of a particular transaction's membership in a partition.

Further, considering FIG. 5, data destined for a particular partition outputted from comparator and dispatcher 84 or 85 enters dispatch buffer 54 or 55, depending on whether the data is identified as even or odd as described above. Dispatch buffers 54 and 55 further provide partition overwrite protection by preventing a tag which is not defined as being within a particular partition from being dispatched to an output not defined as being within the partition in which the tag belongs. Accordingly, a second opportunity to protect separate partitions from errors occurring because of some failure or breakdown of the hardware or logic is provided.

Each port has configuration information that assigns its partition ID and logical ID (address range). The partition membership of each quad 58 is defined by the value of the partition ID field. Logical address range is defined by the setting of the logical ID field. Each port has a Commit and a Write Protect bit. The Commit bit verifies that the partition ID is valid; if Commit is not set, the partition ID is invalid and the effected quad 58 is thereby not a member of any defined partition, and thereby shares nothing with any other quad 58 in system 60.

The Write Protect bit allows a quad 58 to lock itself into a partition so that no other quad 58 can modify its configuration registers; a quad sets its Write Protect bit when it completes its boot sequence and partition integration tasks.

When the Write Protect bit is set, any individual quad 58 always controls its own configuration and other quad 58 requesting a configuration change must do so by requesting the controlling quad 58 to make a configuration change.

When booting the system with quad 58, crossbar 70 provides a CSR (a hardware storage register accessible to software to and from which software can read and write) Mapping Flag bits that allow communications between quads 58 even when such quads are in different partitions. Eight flag bits for each quad 58 may be written only for that effected quad 58 and all thirty-two flags can be read by any quad 58. The address spaces for different partitions cannot be violated by simple address pointer errors because crossbar 70 prevents requests from being sent to any quad 58 in another partition based on the partition ID of the inbound data request. Therefore, in accordance with the invention, inter-partition accesses could only occur because of possible hardware faults or scan operations.

Figure 3:
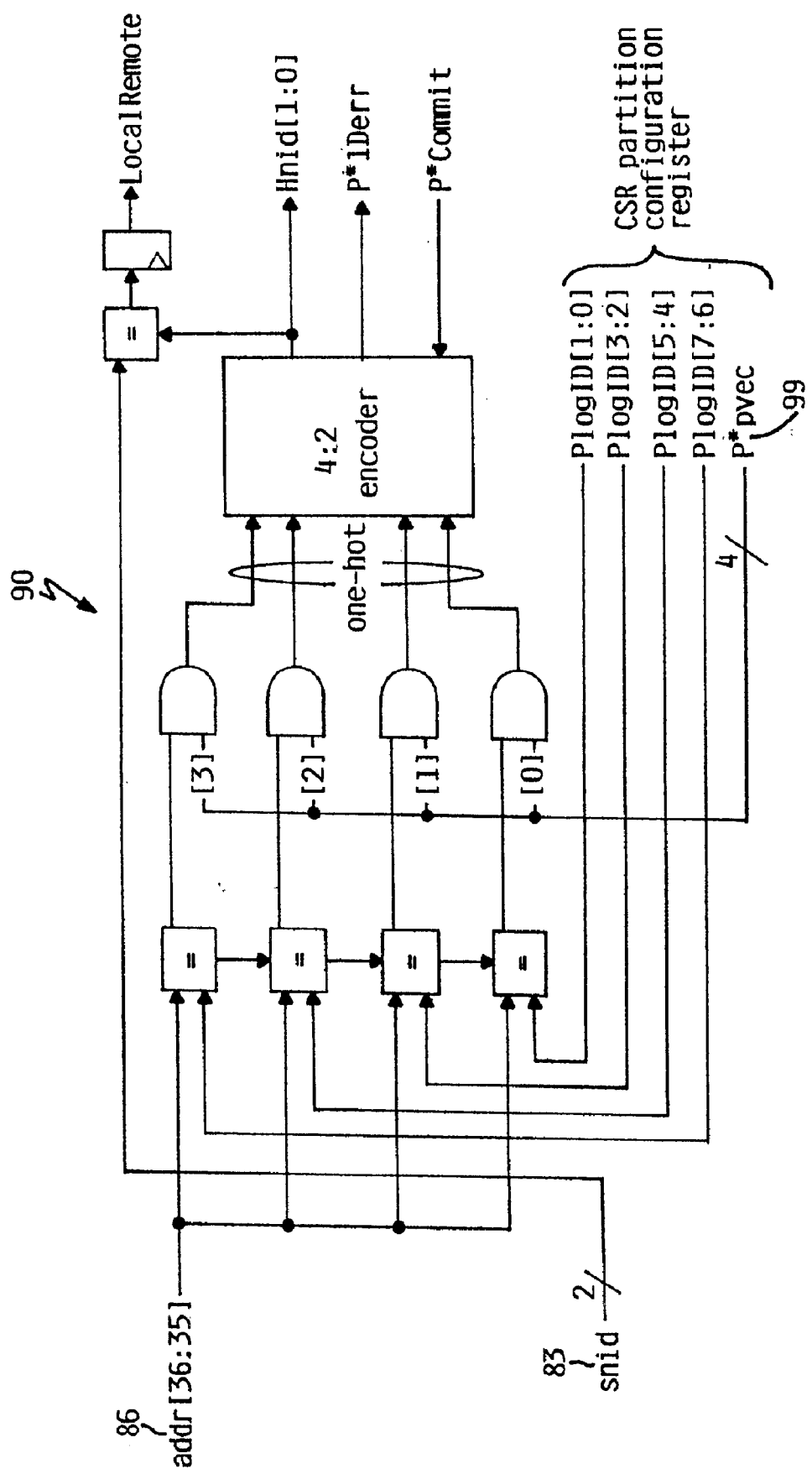
FIG. 3 is a logic diagram illustrating a physical port's hardware support for partitioning in accordance with the present invention.

FIG. 3 illustrates the logic utilized in supporting the partitioning of a physical port FIG. 3 discloses the Home Port ID block 90 (Hop ID) which takes an incoming request of a target address and uses the logical target ID to determine the physical port that determines the physical port of which that request is home. Address bits [36:35] give the logical target ID of a request. They are compared to the programmed logical home ID of each of the potential output ports. PlogID is a vector coming from the CSR block. It gives the 2-bit logical home ID of each physical port that is programmed into a Partition Configuration Register. The comparison should result in at least one match. However, the same logical home ID may also exist in another partition, in which case there will be two matches. Therefore, it must be assured that the incoming and outgoing ports are in the same partition. A 4-bit partition vector is received by each instance of Hop ID 90. It should be understood that the asteric symbol is used in the present disclosure to represent a multi-instant reference, sometimes also refered to in the art as a wild card character.

Figure 7:
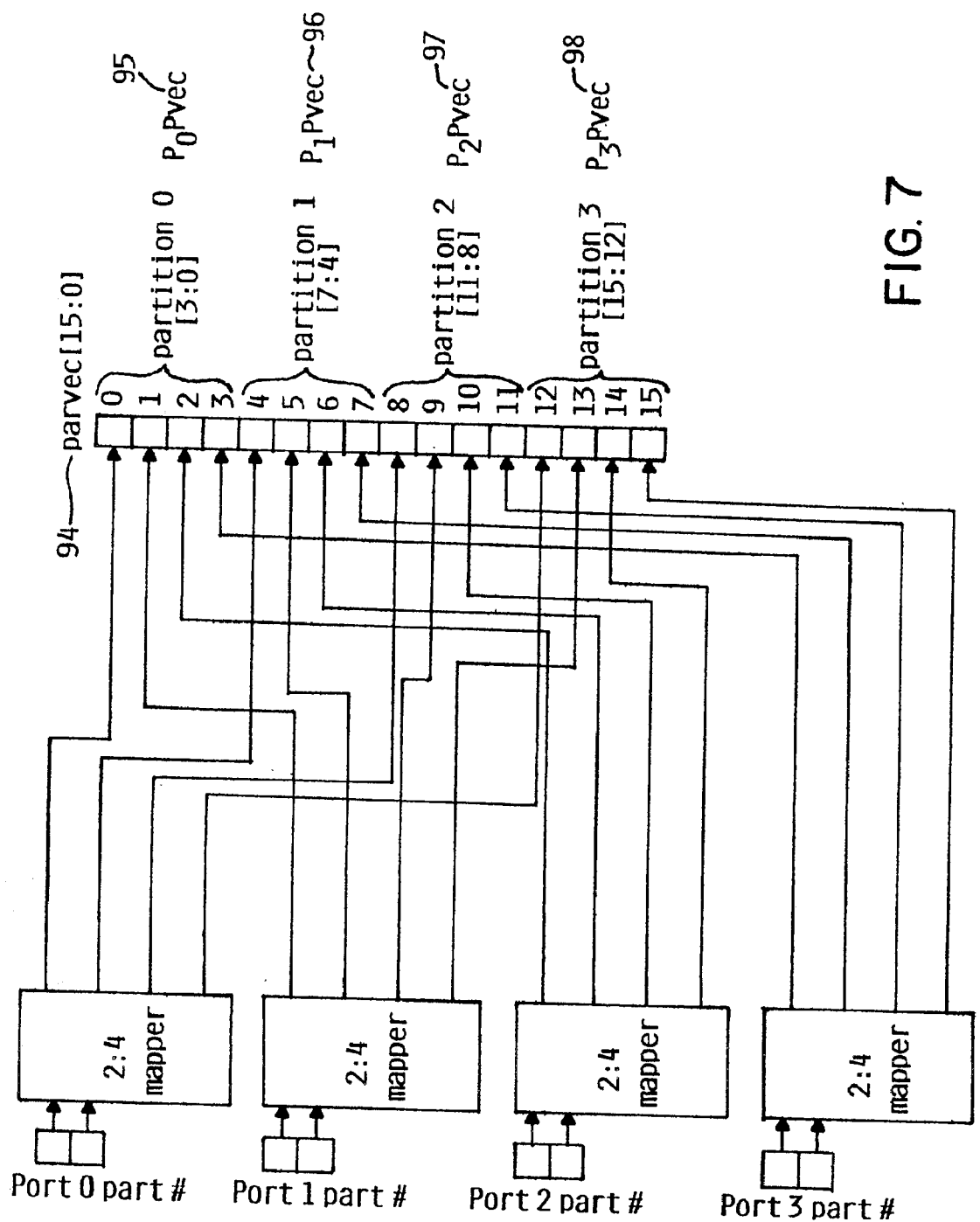
FIG. 7 is a logic diagram illustrating the global configuration register logic used to generate the partition vector bits used in carrying out the present invention.

FIG. 7 illustrates the logic diagram of the partition vector generated by the global configuration register in the invention. Partition vector 94, consisting of 16-bits, is comprised of four separate vectors, each made up of 4-bits. P*pvec is a separate 4-bit vector defining each port in the system as it relates to a particular partition. P0 pvec 95 defines port membership in partition 0, P1 pvec 96 defines membership in partition 1, P2 pvec 97 defines membership in partition 2, and P3pvec 98 defines membership in partition 3—all of which is illustrated in the logic diagram shown in FIG. 7.

Each P*pvec shown in FIG. 7 is connected to P*pvec input 99 shown on FIG. 3. Homeport ID block 90 shown in FIG. 3 is reproduced for each port, being a total of four for the entire system disclosed. It will be appreciated that the 4-bit output of P*pvec shown in FIG. 7 will be connected in each instance to input 99 on FIG. 3. Each SNID 83 in FIG. 3, comprised of 2-bits, defines to which physical node block 90 is attached, being node 0, 1, 2, or 3 in the system. Address 86 in FIG. 3 is comprised of the logical ID of the target address, comprised of 2-bits. P*pvec has each bit set or cleared to indicate which physical ports are in the partition to which this inbound port belongs. For example, if partition 0 includes physical ports 0 and 2 then P*pvec would be 0101b. The partition vector is used as a mask to qualify the comparisons of the address bits and PlogID. There should be one and only one remaining match, which is fed into a 4:2 encoder to produce the home node ID (HnID). The 4:2 encoder values are shown in Table 2.

TABLE 2

| 4:2 encoder values | |
|---|---|
| one-hot input vector | HnID |
| 0001 | 00 |
| 0010 | 01 |
| 0100 | 10 |
| 1000 | 11 |
| others | error |

The HnID is the physical port ID that corresponds to the logical target ID. P*IDerr is asserted if there is not exactly one match and P*Commit is asserted P*Commit comes from the CSR block and is set when this inbound port is committed to a partition. The HnID indicates which physical port has been configured to be home for that address in this partition. It is used to route requests, replies, responses, and data associated with the request to the appropriate tag and address crossbar 70 output port. HnID is delivered to the Input mux during the AD phase.

Continuing with the example above, assume the logical home IDs are configured so that Port 0 has logical ID 00b, Port 1 logical ID 10b, Port 2 logical ID 10b and Port 3 logical ID 01b. PlogID will be 68h. A transation coming into Port 0 with addr[36:35] of 10b is compared with PlogID. There will be match of the logical ID of both Port 1 and Port 2 and the vector out of the comparator 0110b. After it is summed with the partition vector of 0101b, the result is the one-hot vector 0100b, from which the encoder provides a HnID of 10b. The match with Port 1 that is not in the same partition has been masked out. The transaction will be processed knowing that the home port is physical Port 2 based on the HnID of 10b. If the HnID is equal to the snID 83, (physical node ID), then the request is local, and LocalRemote is asserted to the TypeCk block. Otherwise it is remote and LocalRemote is de-asserted. It is delayed by a clock to arrive during the ID phase of the transaction. Table 3 illustrates the content of the partition configuration register, a graphical representation of which is shown in FIG. 8 as an example of the register for port 0.

TABLE 3

| Partition Configuration Register | | | |
|---|---|---|---|
| Name | Bits | Read/Write | Definition |
| Port 0 Partition Write Protect | 1 | Rd/Wr | When set, and Port 0 Committed is set, prevents any Port Committed bit from transitioning from 0 to 1 if the associated Partition # bits match the Port 0 Partition bits unless the CSR write is from a port already committed to the partition. |
| Port 0 Write Protect | 1 | Rd/Wr | Prevents changes to the partition information associated with this port. If this bit is set CSR writes only from this |

TABLE 3-continued

Partition Configuration Register

| Name | Bits | Read/Write | Definition |
|---|---|---|---|
| | | | port may change the contents of the bits associated with this port, including this Write Protect bit. |
| Port 0 Committed | 1 | Rd/Wr | Indicates that the Quad is committed to the partition (below). |
| Port 0 Partition # | 2 | Rd/Wr | Partition number to which the Quad attached to this port belongs. |
| Port 0 Logical Node # | 2 | Rd/Wr | Logical node number within the partition that this port represents. This field determines the address range owned by the Quad attached to this port |
| Port 0 Enable | 1 | Rd/Wr | When set this bit enables port 0 subject to certain conditions. If clear, port 0 is disabled and will not respond to port 0 inbound transactions. |
| Port 1 Partition Write Protect | 1 | Rd/Wr | When set, and Port 1 Committed is set, prevents any Port Committed bit from transitioning from 0 to 1 if the associated Partition # bits match the Port 1 Partition bits unless the CSR write is from a port already committed to the partition. |
| Port 1 Write Protect | 1 | Rd/Wr | Prevents changes to the partition information associated with this port. If this bit is set CSR writes only from this port may change the contents of the bits associated with this port, including this Write Protect bit. |
| Port 1 Committed | 1 | Rd/Wr | Indicates that the Quad is committed to the partition (below). |
| Port 1 Partition # | 2 | Rd/Wr | Partition number to which the Quad attached to this port belongs. |
| Port 1 Logical Node # | 2 | Rd/Wr | Logical node number within the partition that this port represents. This field determines the address range owned by the Quad attached to this port |
| Port 1 Enable | 1 | Rd/Wr | When set this bit enables port 1 subject to certain conditions. If clear, port 1 is disabled and will not respond to port 1 inbound transactions. This bit is cleared at power-on reset |
| Port 2 Partition Write protect | 1 | Rd/Wr | When set, and Port 2 Committed is set, prevents any Port Committed bit from transitioning from 0 to 1 if the associated Partition # bits match the Port 2 Partition bits unless the CSR write is from a port already committed to the partition. |
| Port 2 Write Protect | 1 | Rd/Wr | Prevents changes to the partition information associated with this port. If this bit is set CSR writes only from this port may change the contents of the bits associated with this port, including this Write Protect bit. |
| Port 2 Committed | 1 | Rd/Wr | Indicates that the Quad is committed to the partition (below). |
| Port 2 Partition # | 2 | Rd/Wr | Partition number to which the Quad attached to this port belongs. |
| Port 2 Logical Node # | 2 | Rd/Wr | Logical node number within the partition that this port represents. This field determines the address range owned by the Quad attached to this port |
| Port 2 Enable | 1 | Rd/Wr | When set this bit enables port 2 subject to certain conditions. If clear, port 2 is disabled and will not respond to port 2 inbound transactions. |
| Port 3 Partition Write protect | 1 | Rd/Wr | When set, and Port 3 Committed is set, prevents any Port Committed bit from transitioning from 0 to 1 if the associated Partition # bits match the Port 3 Partition bits unless the CSR write is from a port already committed to the partition. |
| Port 3 Write Protect | 1 | Rd/Wr | Prevents changes to the partition information associated with this port. If this bit is set CSR writes only from this port may change the contents of the bits associated with this port, including this Write Protect bit. |
| Port 3 Committed | 1 | Rd/Wr | Indicates that the Quad is committed to the partition (below). |
| Port 3 Partition # | 2 | Rd/Wr | Partition number to which the Quad attached to this port belongs. |
| Port 3 Logical Node # | 2 | Rd/Wr | Logical node number within the partition that this port represents. This field determines the address range owned by the Quad attached to this port |
| Port 3 Enable | 1 | Rd/Wr | When set this bit enables port 3 subject to certain conditions. If clear, port 3 is disabled and will not respond to port 3 inbound transactions. |

Table 4 is a table of possible partition member register entries. The partition member register is read only. Its contents are calculated from the partition configuration register shown above in Table 3. It will be appreciated by review of Table 4 that the entries define the partition membership of each port, and therefore each quad.

TABLE 4

Partition Member Register

| Name | Bits | Read/Write | Definition |
|---|---|---|---|
| Partition 0-Port 0 | 1 | Rd Only | Set if Port 0 is a member of partition 0 |
| Partition 0-Port 1 | 1 | Rd Only | Set if Port 1 is a member of partition 0 |
| Partition 0-Port 2 | 1 | Rd Only | Set if Port 2 is a member of partition 0 |
| Partition 0-Port 3 | 1 | Rd Only | Set if Port 3 is a member of partition 0 |
| Partition 1-Port 0 | 1 | Rd Only | Set if Port 0 is a member of partition 1 |
| Partition 1-Port 1 | 1 | Rd Only | Set if Port 1 is a member of partition 1 |
| Partition 1-Port 2 | 1 | Rd Only | Set if Port 2 is a member of partition 1 |
| Partition 1-Port 3 | 1 | Rd Only | Set if Port 3 is a member of partition 1 |
| Partition 2-Port 0 | 1 | Rd Only | Set if Port 0 is a member of partition 2 |
| Partition 2-Port 1 | 1 | Rd Only | Set if Port 1 is a member of partition 2 |
| Partition 2-Port 2 | 1 | Rd Only | Set if Port 2 is a member of partition 2 |
| Partition 2-Port 3 | 1 | Rd Only | Set if Port 3 is a member of partition 2 |
| Partition 3-Port 0 | 1 | Rd Only | Set if Port 0 is a member of partition 3 |
| Partition 3-Port 1 | 1 | Rd Only | Set if Port 1 is a member of partition 3 |
| Partition 3-Port 2 | 1 | Rd Only | Set if Port 2 is a member of partition 3 |
| Partition 3-Port 3 | 1 | Rd Only | Set if Port 3 is a member of partition 3 |

Table 5 provides the definitions of the port flag register.

TABLE 5

Port Flag Register

| Name | Bits | Read/Write | Definition |
|---|---|---|---|
| Port 0 Flag | 8 | Rd/Wr | These bits can be written only by port 0, but can be read by any port. |
| Port 1 Flag | 8 | Rd/Wr | These bits can be written only by port 1, but can be read by any port. |
| Port 2 Flag | 8 | Rd/Wr | These bits can be written only by port 2, but can be read by any port. |
| Port 3 Flag | 8 | Rd/Wr | These bits can be written only by port 3, but can be read by any port. |

Table 6 illustrates the port identification register.

TABLE 6

Port ID Register

| Name | Bits | Read/Write | Definition |
|---|---|---|---|
| Port ID | 2 | Rd | Returns the ID of the port to which the access was made. |

Tag and address crossbar 70 Control and Stats Registers (CSRA) hold initialization, configuration, control, and status information relating to various features and operations within tag and address crossbar 70. They all may be accessed either by scan or from control agent 66 through a serial CSR interface to tag and address crossbar 70. CSRs are either port specific or global. Port specific registers relate to a particular bus 73 port. Each port has its own set. Port specific registers are further divided into performance counters and kernel categories. The kernel category consists of configuration and diagnostic registers, for which access should be restricted. Each category is aligned on a 16k page boundary. Global registers pertain to Tag and address crossbar 70 as a whole. There is only one copy of a global register, which is seen in the address space of each of the ports.

Each quad 58 in the system 60 has 64 kb of tag and address crossbar 70 CSR memory space, each at a specific address range. These addresses appear in the address space of all quads in a partition, and are therefore referred to as Shared CSR addresses. In addition, each quad 58 has 64 kb of local tag and address crossbar 70 CSR memory space. Accesses to Local CSR memory space are routed to the CSRs associated with the physical port that receives the access. Therefore, registers are only accessible at the Local CSR address through the port to which they are local.

Figure 4:
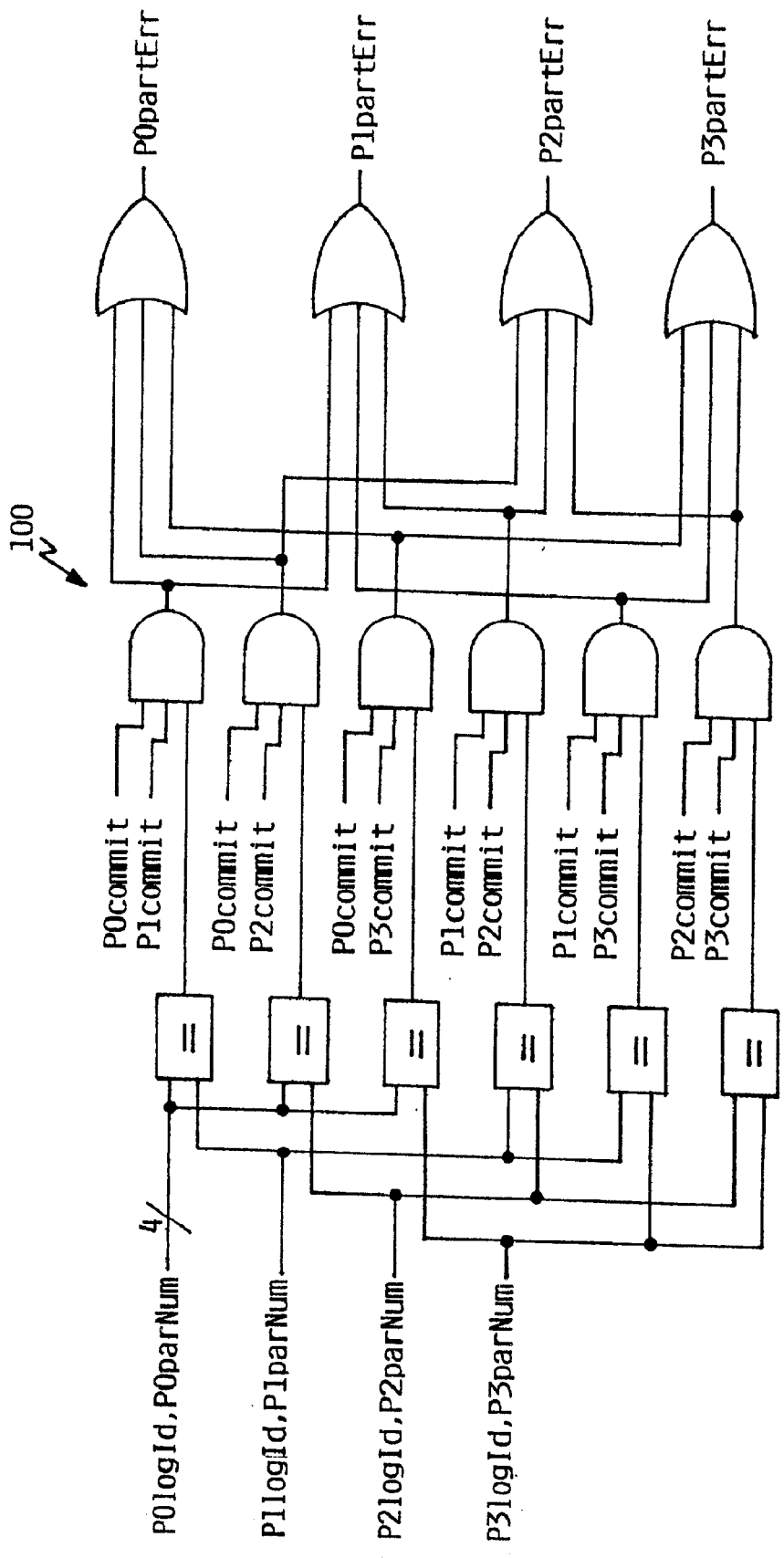
FIG. 4 is a logic diagram illustrating the global register block which includes the partition error detection logic used in carrying out the present invention.

The global register block logic is shown in FIG. 4. In addition to holding the global category of CSR registers, the Global Register block 100 performs other logical services. It will check for partition inconsistencies, where a port is being configured to have the same logical ID as a Port that is already committed to the partition. P*logID is the two bit logical ID value programmed for each port. P*parNum is the two-bit partition number programmed for each port. Only ports which are already committed to a partition are considered. The error is flagged when the duplicate P*parNum and P*logID are written and the P*Commit bits are set. The CSR Global Register block is also responsible for generation of the partition vector (parvec), the 16-bit vector that collectively summarizes the status of all bus 73 ports that are included in the four possible partitions in the system shown in the preferred embodiment. It is used internally to tag and address crossbar 70 and is also visible as a CSR register. There is a programmable 2-bit field for each bus 73 port that contains the number of the partition to which the port belongs. These port references are listed in Table 7.

TABLE 7

Port References

| Port Partition # | Vector |
|---|---|
| 00 | 0001 |
| 01 | 0010 |
| 10 | 0100 |
| 11 | 1000 |

Figure 9:
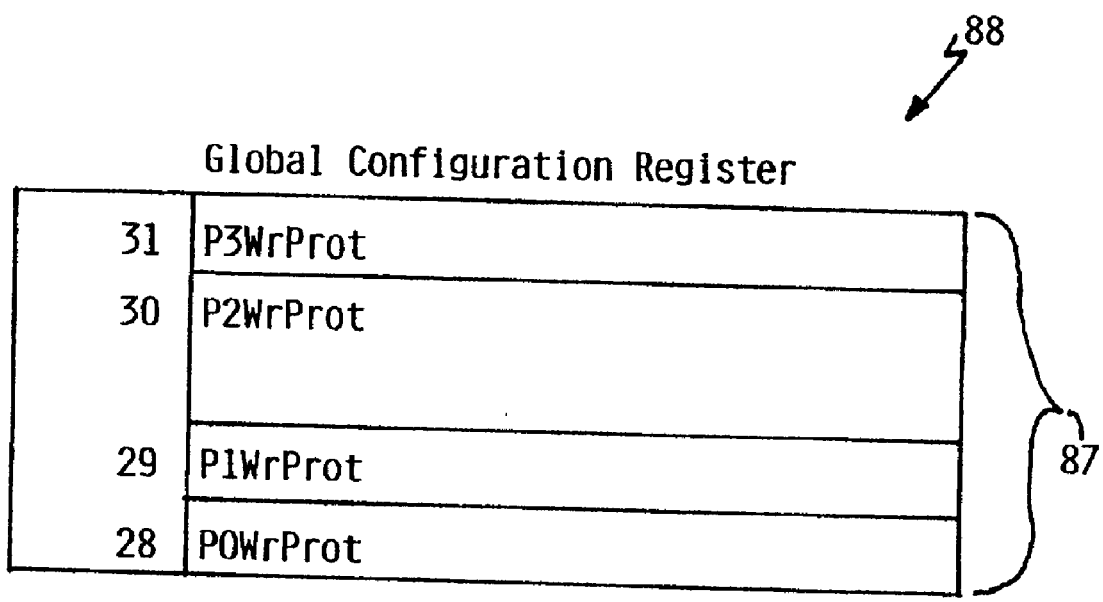
FIG. 9 is a diagram illustrating the partial contents of the global configuration register used in accordance with the present invention.

FIG. 9 illustrates part of the global configuration register used to configure system-wide parameters. FIG. 9 is truncated for clarity, as it illustrates only the definitions of bit numbers 28 through 31 inclusive shown as group 87 in FIG. 9. Each port of system 60 has its own individual P*WrPROT bit to which only that port can write. All ports of the system can read the entire register 88. All bits in this register other than those in the write protect bit group 87 are write protected if any of the ports have set their P*WrPROT bit. In register 88, the first port to write to the register and set its write protection bit establishes the configuration, thereafter, only changes can be made with the cooperation of all ports. In the preferred embodiment, the register can be read to determine which ports have their write protect bits set if it is desired to read the status of the write protect bits 87. It will be appreciated that since register 88 is illustrated in FIG. 9 as a truncated version of the entire register in that the register is comprised of 32 bits, the remaining bits of register 88 down to and including bit 0 have other functions in the system, not directly related to the partition write protection system described herein. It will be further appreciated that the P*WrPROT bits are functionally distinct and independent from the partition write protect bit P*PartWrProt bits 77 and the port write protect bits P*PortWrProt bit 78.

FIG. 8 illustrates port 0 partition configuration register 89. Register 89 is also a 32 bit register used to store information about each port's configuration relative to its partition assignment. As each physical port in the system has a partition configuration register equivalent to register 89 in FIG. 8, it can be appreciated that the description of register 89 also describes the other three configuration registers for ports 1, 2, and 3 in the embodiment disclosed. Each configuration register is located at a separate local control and status register (CSR) address. All the partition configuration registers for all four ports may be accessed from any port in the system. As described in FIG. 8, configuration register 89 is used to specify information about crossbar 70's physical port 0, shown on FIG. 1, and the partition to which port 0 belongs. Port 0's connections to crossbar 70 are shown at input 40 and output 45 in FIG. 1.

A partition write protect bit, P0PartWrProt 77, and a port write protect, P0PortWrProt 78, are used to restrict write access and protect partitions from non-member quads (via their ports) in the system. In the invention, a restriction is provided that a specified bit must be in a certain state in order to enable writing of another bit, and such state must exist before a write is successful in changing the state of that bit In general, either write protect bit does not restrict writes by the port that owns the Partition Configuration register that is the target of the write (or the target port, in this case, port 0), except that P0PartWrProt 77 can only be written by a port that is member of the target port's committed partition. P0PartWrProt 77 restricts writes of bits 91, 79, and 93 by non-owner ports, all under certain circumstances. P0PortWrProt 78 restricts writes of bits 91, 78, 79, 92, and 93 by non-owner ports, all under certain circumstances. Each bit or field that is protected by these two write protect bits does so under the following circumstances:

P0Enable 91 is protected from writes by non-owning ports when P0PortWrProt 78 is active, and is protected from writes by non-members of its committed partition when P0PartWrProt 77 is active.

P0PartWrProt 77 is protected from writes by ports that are non-members of the target port's committed partition.

P0PortWrProt 78 is protected from writes by any non-owner port if it is already active.

P0Commit 79 is protected from writes by any non-owner port if P0PortWrProt 78 is active, or writes by non-owner ports that have their port's PartWrProt active and have a different ParNum.

P0logID 92 is protected from writes by any non-owner port if P0PortWrProt 78 is active.

P0ParNum 93 is protected from writes by any non-owner port if P0PortWrProt 78 is active, or writes after it has been committed (by activating P0Commit 79) while any other port has its PartWrProt active and has the same ParNum as being written here (this blocks a committed port from simply changing its ParNum).

P0enable bit 91 is a bit that enables port 0 subject to certain conditions. If bit 91 is clear, port 0 in the system is disabled and will not respond to port 0 inbound transactions.

P0logID 92 is a two bit field (3:2) which identifies the logical node ID of crossbar 70 physical port 0, being shown as the bus comprised of input 40 and output 45 in FIG. 1. Bit 92 is used in crossbar 70's input block to determine whether port 0 is the target of a transaction.

P0Commit bit 79 determines whether port 0 is to be part of the partition indicated by field 93, which is P0ParNum.

When bit 79 is cleared, then port 0 is not considered to be part of any partition. It could be appreciated that if the P0Commit bit 79, or its equivalent in the partition configuration registers for other ports is not set, it is possible that a particular port will not be assigned to any partition in the system and therefore could be disabled if desired. Therefore, the invention allows selection of one or more nodes to operate within a given partition, while disabling one or more nodes to be dormant in a given configuration of the system.

Advantages

With the above, a complete disclosure for a system to allow different operating systems to co-exist on the same physical computer system has been demonstrated with details implementing the invention in a preferred embodiment. Further, specific implementation of the method and the apparatus disclosed enable inter-partition data passing to utilize existing high performance data connections in a multi-node system such that the input/output subsystems can remain a shared hardware resource. It should be appreciated that with the system and method disclosed it is possible to obtain significant data protection across partitioned resources without utilizing each of the subsystems demonstrated in the detailed disclosure above and the various drawings and figures provided.

Alternatives

The system is not necessarily limited to the specific number of processors or the array of processors disclosed, but may be used in similar system designs using interconnected memory control systems with tagging, address crossbar and data crossbar systems to communicate between the controllers to implement the present invention Accordingly, the scope of the present invention fully encompasses other embodiments which may become apparent to those skilled in the art. Furthermore, the scope of the present invention is to be limited by nothing other than the appended claims.

We claim:

1. A multiprocessor computer system capable of being partitioned into one or more independently functioning processing systems comprising:

a plurality of processing nodes, each node including memory which is accessible locally by the node associated with said memory and remotely by any other node;

a shared, distributed system memory;

a communications pathway which interconnects said plurality of processing nodes, each node capable of operating independently, wherein each one of said processing nodes includes at least one processor and a portion of said shared system memory coupled to said processor and said communication pathway, and wherein said communication pathway is comprised of a central hardware device including tag and address means to communicate the identification of data transactions being processed through the system connected to said plurality of processing nodes, said tag and address means including means to store information related to the identification of a partition to which said data is associated, said central hardware device storing information for determining which nodes are storing copies of data which is associated with a given partition;

means to define one or more partitions to which one or more of said nodes are a member; and means to associate each data transaction processed in the system to direct data only to such nodes defined as within the same partition of said data, including dispatch means which interconnect with said ports but allow communications with said ports only for data transactions defined for a partition for which said port is a member.

2. The multiprocessor system of claim 1, wherein said tag and address means further includes a register means associated with each node, said register means separably connected through said communications pathway only to one of said nodes, whereby each of said register means is connected to only one of said nodes, where each said register means accepts and forwards data transactions only identified as valid for the partition which said resister is connected.

3. The multiprocessor system of claim 2, wherein further said tag and address means includes dispatch means which restrict output of data transactions to only nodes which are defined within the partition with which the data is identified, and a second target node which is the destination of the requested data, wherein further said central hardware device transmits requests from the said requesting node to the said target node but not to any other node.

4. A multiprocessor computer system capable of being partitioned into one or more independently functioning processing systems comprising:
 a plurality of processing nodes, each node capable of operating independently;
 a shared, distributed system memory;
 a communications pathway which interconnects said plurality of processing nodes, wherein each one of said processing nodes includes at least one processor and a portion of said shared system memory coupled to said processor and said communication pathway, wherein said communication pathway is comprised of a central hardware device including tag and address means to communicate the identification of data transactions being processed through the system connected to said plurality of processing nodes, said tag and address means including a first register means to store information related to the identification of a partition to which said data in associated, and a second register means to define at most one partition to which one or more of said nodes are a member; and
 means to associate each data transaction processed in the system such as to direct data only to such nodes defined as within the same partition of said data,
 wherein said tag and address means further includes a registers means associated with each node, said register means separately connected through said communications pathway only to one of said nodes, whereby each of said register means is connected to only one of said nodes, wherein each said register means accepts and forwards data transactions only identified as valid for the partition which said register is connected.

5. The multiprocessor system of claim 4, wherein further said tag and address means includes dispatch means which restrict output of data transactions to only nodes which are defined within the partition with which the data is identified, and a second target node which is the destination of the requested data, wherein further said central hardware device transmits requests from the said requesting node to the said target node but not to any other node.

6. A multiprocessor computer system capable of being partitioned into one or more independently functioning processing systems comprising:
 a plurality of processing nodes, each node capable of operating independently;
 a shared, distributed system memory;
 a communications pathway which interconnects said plurality of processing nodes, wherein each one of said processing nodes includes at least one processor and a portion of said shared system memory coupled to said processor and said communication pathway, wherein said communication pathway is comprised of a central hardware device including tag and address means to communicate the identification of data transactions being processed through the system connected to said plurality of processing nodes, said tag and address means including first register means to store information related to the identification of a partition to which said data is associated, and a second register means to define at most one partition to which one or more of said nodes are a member; and
 means to associate each data transaction processed in the system such as to direct data only to such nodes defined as within the same partition of said data,
 wherein said tag and address means includes dispatch means which restrict output of data transactions to only nodes which are defined within the partition with which the data is identified, and a second target node which is the destination of the requested data, wherein further said central hardware device transmits requests from the said requesting node to the said target node but not to any other node.

7. The multiprocessor system of claim 6, wherein further said tag and address means includes dispatch means which restrict output of data transactions to only nodes which are defined within the partition with which the data is identified, and a second target node which is the destination of the requested data, wherein further said central hardware device transmits requests from the said requesting node to the said target node but not to any other node.

8. In a multiprocessor computer system comprising a plurality of processing nodes; a shared, distributed system memory; and a communication pathway connecting said processing nodes; wherein each one of said processing nodes includes at least one processor; and a portion of said shared system memory coupled to said processor and said communication pathway; each node including memory which is accessible locally by the node associated with said memory and remotely by any other node; said communications pathway comprised of communications ports each dedicated to communicating with one of said processing nodes; a method for partitioning the resources of the system into two or more partitions; the method comprising the steps of:
 assigning a physical address to at least two of said ports;
 assigning a logical address to each said physical address;
 storing said logical address in a memory;
 defining each of said processing nodes to correspond to no more than one partition, such that said ports are interconnected with a dispatch mechanism that allows communications with said ports only for data transactions defined for a partition for which said port is a member, and;
 routing data within the system to correspond with the addresses of the resources defined as a partition, via a central hardware device of said communication pathway storing information for determining which nodes are storing copies of data which is associated with a given partition.

9. The method of claim 8 wherein one or more of said processing nodes may be defined as corresponding to no partition.

10. The method of claim 8 farther including the step of labeling data requests within the system to a logical address corresponding to the partition issuing said request.

11. In a multiprocessor computer system comprising a plurality of processing nodes; a shared, distributed system memory; and a communication pathway connecting said processing nodes; wherein each one of said processing nodes includes at least one processor; and a portion of said shared system memory coupled to said processor and said communication pathway; each node including memory which is accessible locally by the node associated with said memory and remotely by any other node; said communications pathway comprised of communications ports each dedicated to communicating with one of said processing nodes; a method for partitioning the resources of the system into two or more partitions; the method comprising the steps of:

assigning a physical address to each of said ports;

assigning a logical address to each said physical address;

storing said logical address in a memory;

defining each logical address to correspond to no more than one partition, such that said ports are interconnected with a dispatch mechanism that allows communications with said ports only for data transactions defined for a partition for which said port is a member;

assigning identification to each data transaction within the system which corresponds to the logical address to which the transaction is associated;

comparing said identified transaction with said logical address in memory corresponding to only one partition; and routing data within the system to said ports defined as a member of the partition with which the data is associated, via a central hardware device of said communication pathway storing information for determining which nodes are storing copies of data which is associated with a given partition.

12. The method of claim 11 further including the step of routing data requests within the system to a cache memory within said communications pathway with a logical address corresponding to the partition issuing said request, with said cache memory physically interconnected only with a port assigned to a physical address.

13. A multiprocessor computer system capable of being partitioned into one or more independently functioning processing systems comprising:

a plurality of processing nodes, each node capable of operating independently;

a shared, distributed system memory;

a communications pathway which interconnects said plurality of processing nodes, wherein each one of said processing nodes includes at least one processor and a portion of said shared system memory coupled to said processor and said communication pathway, wherein said communication pathway is comprised of a central hardware device including a tag and address mechanism to communicate the identification of data transactions being processed through the system connected to said plurality of processing nodes, said tag and address mechanism including a first register to store information related to the identification of a partition to which said data is associated, and a second register to define at most one partition to which one or more of said nodes are a member; and a mechanism to associate each data transaction processed in the system such as to direct data only to such nodes defined as within the same partition of said data, wherein said tag and address mechanism further includes a registers associated with each node, said register separately connected through said communications pathway only to one of said nodes, whereby each of said register is connected to only one of said nodes, wherein each said register accepts and forwards data transactions only identified as valid for the partition which said register is connected.

14. A multiprocessor computer system capable of being partitioned into one or more independently functioning processing systems comprising:

a plurality of processing nodes, each node capable of operating independently;

a shared, distributed system memory;

a communications pathway which interconnects said plurality of processing nodes, wherein each one of said processing nodes includes at least one processor and a portion of said shared system memory coupled to said processor and said communication pathway, wherein said communication pathway is comprised of a central hardware device including a tag and address mechanism to communicate the identification of data transactions being processed through the system connected to said plurality of processing nodes, said tag and address mechanism including a first register to store information related to the identification of a partition to which said data is associated, and a second register to define at most one partition to which one or more of said nodes are a member; and a mechanism to associate each data transaction processed in the system such as to direct data only to such nodes defined as within the same partition of said data, wherein further said tag and address mechanism includes a dispatch mechanism which restrict output of data transactions to only nodes which are defined within the partition with which the data is identified, and a second target node which is the destination of the requested data, wherein further said central hardware device transmits requests from the said requesting node to the said target node but not to any other node.

* * * * *